UNITED STATES PATENT OFFICE.

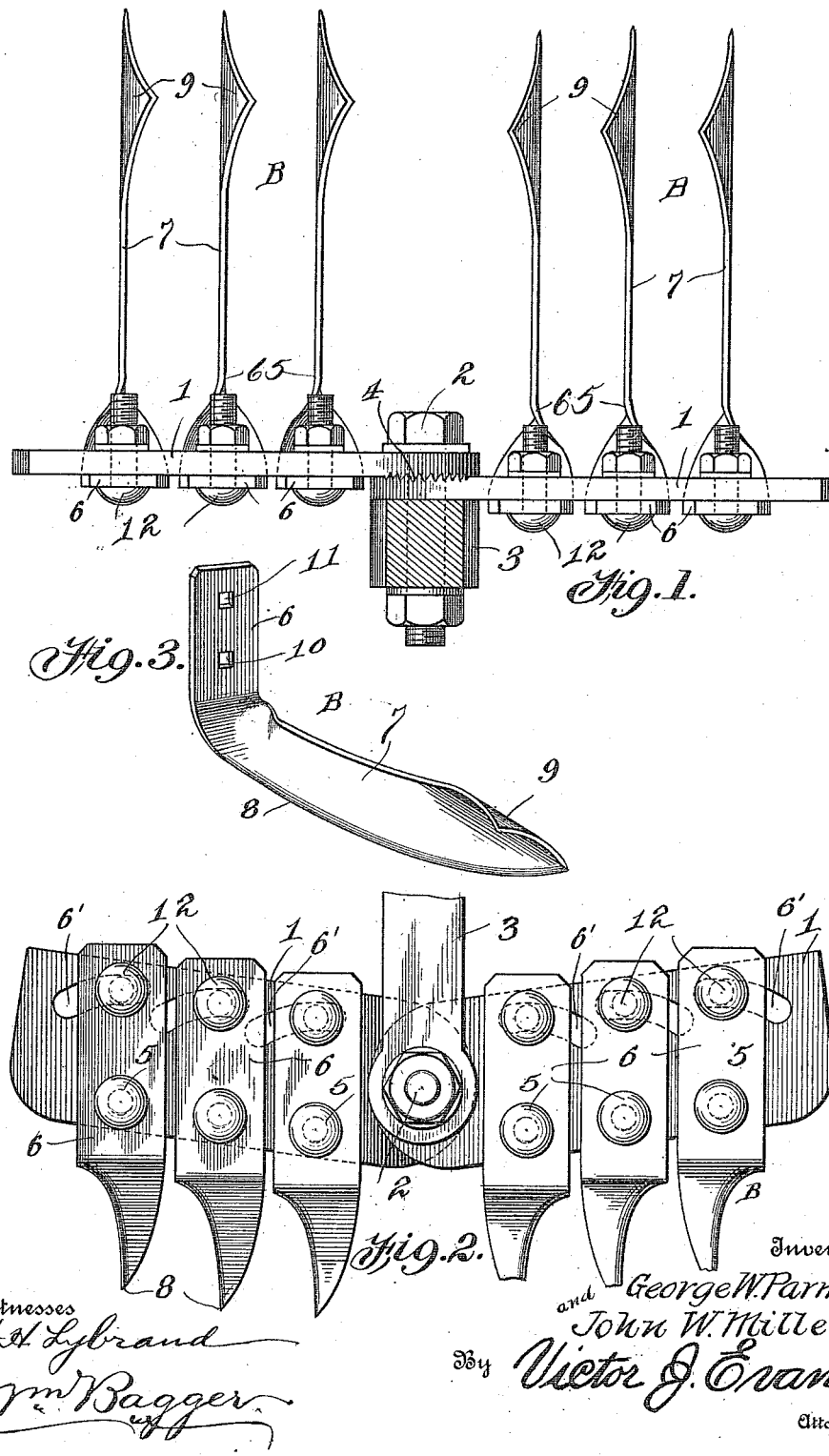

GEORGE W. PARMER AND JOHN W. MILLER, OF SUNSET, TEXAS.

CULTIVATOR ATTACHMENT.

986,209. Specification of Letters Patent. Patented Mar. 7, 1911.

Application filed September 9, 1910. Serial No. 581,147.

*To all whom it may concern:*

Be it known that we, GEORGE W. PARMER and JOHN W. MILLER, citizens of the United States of America, residing at Sunset, in the county of Montague and State of Texas, have invented new and useful Improvements in Cultivator Attachments, of which the following is a specification.

This invention relates to an improved implement which is in the nature of an attachment for cultivators and the like, said implement or attachment comprising a plurality of earth-engaging blades which may be mounted for operation upon the stock or standard of a plow or cultivator beam for the purpose of crushing and pulverizing the surface of the soil.

When heavy rains occur soon after the planting of seed, it frequently happens that the soil becomes caked and hardened, thus preventing the seed from sprouting and necessitating replanting at a considerable expense of time.

A particular object of the present invention is to provide an implement whereby the soil may be successfully and effectively broken and pulverized, wherever seed has been planted in drills, thus loosening and reducing the surface and enabling the seed to sprout successfully where without such treatment the sprouting would be impossible.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of the improved cultivator attachment showing the same applied to a plow foot, the latter being shown in section. Fig. 2 is a front elevation. Fig. 3 is a perspective detail view showing one of the earth-engaging blades detached.

Corresponding parts in the several figures are denoted by like characters of reference.

The improved cultivator attachment includes two arms or wings 1, 1, which are disposed in an approximately vertical plane, transversely of the implement or carrying member with which they are connected, as will be hereinafter described, and each of which is apertured for the passage of a fastening member, such as a bolt 2, whereby the wings may be mounted securely in position upon a plow foot 3. The opposed faces of the wings are provided adjacent to the apertures with interengaging teeth 4, whereby the said wings, when the fastening member is tightened, will be held very securely in adjusted position.

Each of the wings is provided adjacent to its lower edge with apertures for the passage of a plurality of pivotal members such as bolts 5 and adjacent to its upper edge with a plurality of arcuate slots 6' which are concentric with reference to the bolt-receiving apertures. Pivotally mounted upon the bolts 5 are blades B, each blade including an upstanding flat shank portion 6 and a rearwardly extending earth-engaging cutting member 7 having a convex or arcuate cutting edge 8 and terminating adjacent to its rear edge in a laterally extending suitably curved flange portion 9. The shank portion 6 of each blade is provided with non-circular apertures 10, 11 for the passage, respectively, of the pivotal bolt member 5 and of a fastening bolt 12, which latter extends through one of the arcuate slots 6 in the wings or arms 1. The earth-engaging portions 7 of the blades are made right and left handed with reference to the two wings, as will be clearly seen in Figs. 1 and 2 of the drawings. It is evident that by exchanging or transferring the blades from each wing to the opposite one, the blades may be arranged to move the dirt inwardly or outwardly with reference to the center of the device.

From the foregoing description, taken in connection with the drawing hereto annexed, the operation and advantages of this invention will be readily understood by those skilled in the art to which it appertains. The improved cultivator attachment is of an extremely simple construction, and it may be readily applied to any ordinary plow stock, thus enabling a single plow stock to be utilized for a variety of purposes. As will be readily seen, the individual blades are capable of being easily adjusted to various positions with reference to the carrying wings or arms, and the latter may likewise be adjusted at various angles with reference to each other and to the plow foot with which they are connected. It will thus appear that the blades may be adjusted in such a manner that the surface of the soil will be broken and pulverized without stirring, agitating or displacing the same to any considerable extent, while, on the other hand, when it shall be desired to do so, the surface of the soil may be not only pulverized but also displaced laterally in any direction.

Having thus described the invention, what is claimed as new, is:—

1. A cultivator attachment comprising two wings disposed in an approximately vertical plane, means for connecting said wings pivotally and adjustably with each other, and a plurality of blades having flat upstanding shank portions pivoted upon the wings, intermediate twisted portions and rearward extending blades lying in planes substantially at right angles to the upstanding shank portions; and means for securing the shank portions of the blades at various adjustments about the axes of their respective pivots.

2. A carrying element consisting of a plow foot, a pair of wings disposed in a substantially vertical plane, means for connecting said wings pivotally and adjustably together and upon the plow foot; blades having flat upstanding shank portions, intermediate twisted portions and rearward extending earth engaging portions, the latter being disposed in planes substantially at right angles to the upstanding shank portions, bolts extending through the upstanding shank portions and through the wings to pivotally support the shank portions, and adjusting bolts; the wings being provided with arcuate slots concentric with the pivotal bolts for the passage of the adjusting bolts.

In testimony whereof we affix our signatures in presence of two witnesses.

GEORGE W. PARMER.
JOHN W. MILLER.

Witnesses:
C. T. BYSON,
A. B. MASTERS.

---

Copies of this patent may be obtained for five cents each, by addressing the "Commissioner of Patents Washington, D. C."